June 3, 1924.
D. BARTLETT
GRAIN DAMPENER
Filed May 21, 1923    2 Sheets-Sheet 1
1,496,615
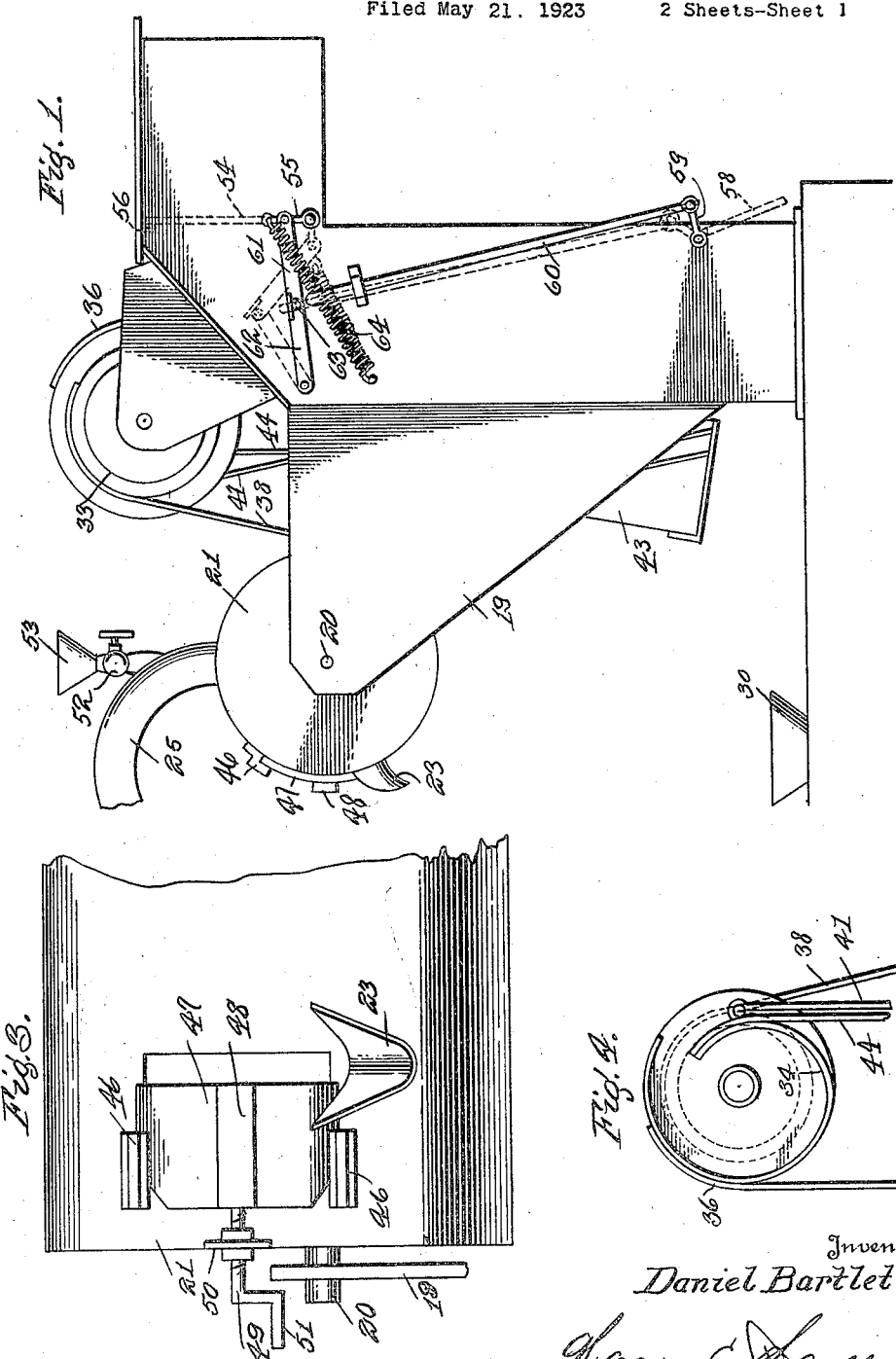
Inventor
Daniel Bartlett.
By 
Attorney June 3, 1924.
D. BARTLETT
GRAIN DAMPENER
Filed May 21, 1923   2 Sheets-Sheet 2
1,496,615
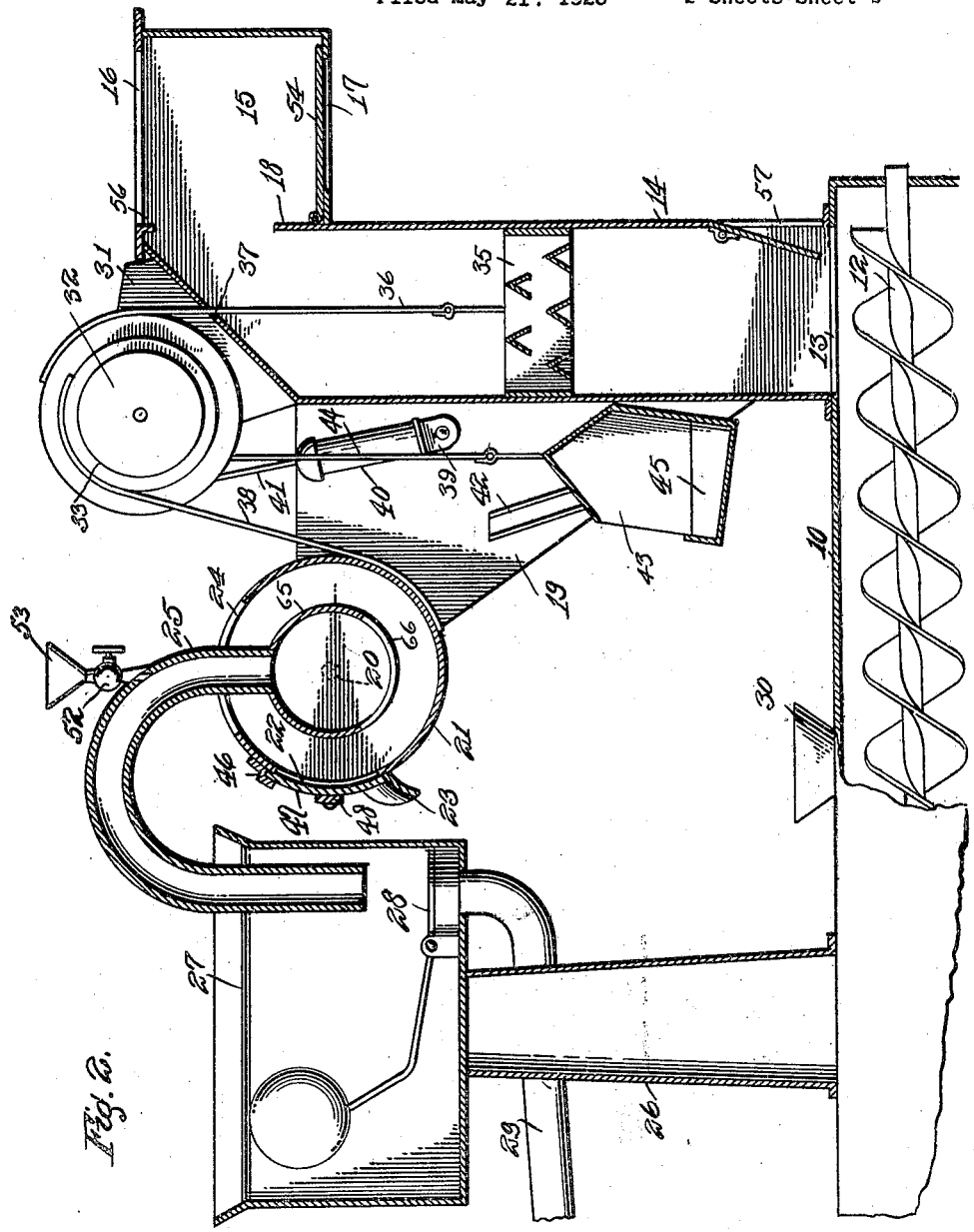
Inventor
Daniel Bartlett.
By Horace C. [Chandler]
Attorney Patented June 3, 1924.

1,496,615

UNITED STATES PATENT OFFICE.

DANIEL BARTLETT, OF EL RENO, OKLAHOMA, ASSIGNOR TO BARTLETT DAMPENER CO., OF EL RENO, OKLAHOMA, A CORPORATION.

GRAIN DAMPENER.

Application filed May 21, 1923. Serial No. 640,482.

*To all whom it may concern:*

Be it known that I, DANIEL BARTLETT, a citizen of the United States, residing at El Reno, in the county of Canadian and State of Oklahoma, have invented certain new and useful Improvements in Grain Dampeners; and I do hereby declare the following to be a full, clear, and exact description of the invention, such as will enable others skilled in the art to which it appertains to make and use the same.

This invention relates to new and useful improvements in dampening devices and particularly to devices for dampening grain.

One object of the invention is to provide a device of this character which is automatic in its action to regulate the flow of water to the grain.

Another object is to provide a device of this character wherein is disposed a water receptacle which normally discharges a flow of water to the grain, commensurate with the rate of flow of the grain, and wherein when the flow of grain increases the flow of water will increase, and when the flow of grain decreases the flow of water will decrease.

Another object is to provide a grain dampener of this character wherein should the screw conveyor become clogged with grain, and stop, the flow of grain will be shunted outside of the feed pipe, thus cutting off the supply of grain to the conveyor.

Other objects and advantages will be apparent from the following description when taken in connection with the accompanying drawing.

In the drawing:

Figure 1 is a side elevation of a grain dampening machine made in accordance with the invention.

Figure 2 is a vertical longitudinal central sectional view through the device, the water supply tank being omitted, and slightly enlarged.

Figure 3 is a detail view of a portion of the rocking tank, showing the discharge regulating means.

Figure 4 is a detail of the wheel, showing the spiral rib.

Referring particularly to the accompanying drawing, 10 represents a base which is supported on the longitudinally extending casing or tube, of the screw conveyor 12. This type of conveyor is shown for purpose of illustration, but any other suitable type may be employed. Adjacent one end of the casing 11 is formed a comparatively large opening 13, and secured on the base, and covering this opening, is the vertical grain feeding pipe 14, which has the lateral branch 15 on its upper end, said branch being closed except for the grain entrance opening 16 in its upper side, and the grain exit opening 17 in its bottom wall, as will be more clearly explained later herein. Disposed vertically and transversely at the juncture of the pipe 14 and its branch 15, is a baffle wall 18, which prevents the grain from falling directly down the pipe 14, as it enters the inlet opening 16. Mounted on the pipe 14, and extending in a direction toward the other end of the base, are the brackets 19, in the outer ends of which are supported the ends or trunnions 20 of the cylindrical rocking tank 21, which has a discharge slot 22 in its curved side, and a pouring lip 23 below said slot. In the upper side of the tank 21 there is formed an opening 24 which receives the end of the curved siphon pipe 25.

Supported on the post 26, at the other end of the base 10, is a supply tank or reservoir 27, into which is extended the other end of the siphon pipe 25. This last-named end of the pipe 25 is disposed over the inlet of the tank 27, and controlling this inlet is a float valve 28, the water being conducted to the tank by the pipe 29, from any suitable source. In the base 10, below the tank 21, and in position to receive water from the pouring lip or spout 23, is a funnel 30, which conducts water into the casing 11 and onto the grain as it flows with the screw conveyor. It will be noted that the opening 24 is of sufficient size to permit the tank 21 to rock without interference of the siphon pipe 25.

Mounted on the inner end of the branch 15 are the brackets 31, the same extending outwardly over the brackets 19, and between the tank 21 and the pipe 14. Rotatably supported on the brackets 31 is a wheel 32, which has the concentric flange 33 on one side, and a spiral flange 34 on its other side. Disposed for vertical slidable movement in the pipe 14 is a grid or grate 35, the same having a cable or strap 36 connected thereto and extending upwardly through an opening 37 in the inner end of the branch 15, and over the peripheral face of the wheel 32, to which it is secured. Secured to the concentric flange 33, engaged thereover, and engaged beneath the tank 21, to which it is also secured, is a cable or strap 38, whereby when the wheel 32 turns in one direction, the tank 21 will be rocked and the flow of water therefrom increased. This turning of the wheel is accomplished by the downward movement of the grid 35, under the weight of the normal flow of grain therethrough. On a bracket 39, on the side of the pipe 14, is supported the cylinder 40 of a dash-pot, the piston rod 41, of which, is pivotally connected to the side of the wheel 32, for the purpose of preventing the too sudden rocking of the tank 21 in either direction.

On the inner faces of the brackets 19 are secured the vertical tracks 42, and slidable on these tracks is a box 43, which has a cable or strap 44 engaged on the peripheral face of the spiral flange 34, and secured thereto. The box 43 is adapted to receive the weights 45, for the purpose of varying the downward pull of the box, and equalizing or balancing the downward pull of the grid 35. By reason of the spiral flange, the opposite pull of the box 43 and the grid 35 will be properly controlled, because of the fact that as the grid causes the rotation of the wheel 32, the spiral flange moves the strap 44 gradually further from the center of the wheel, resulting in the more rapid taking up of the strap, and the consequent increase in rocking movement of the tank 21, to cause more water to flow therefrom.

Mounted on the rocking tank, at one side of the slot 22, and above and below the same, are the longitudinally extending guides 46, in which is slidably disposed the plate 47, for movement across the slot and control of the flow of water therefrom. Transversely on the intermediate portion of the plate 47 there is formed a rib 48 having an internally threaded bore which receives the threaded portion of the screw shaft 49, the outer portion of the said shaft being rotatably retained in a bearing 50, on the end of the tank, and is provided with a crank handle 51. By rotating the crank handle, the plate 47 may be moved across the slot 22, to open and close the same, to different degrees, and thereby regulate the flow of water from the tank.

The intermediate portion of the siphon pipe 25 is provided with an exhaust petcock 52, for the purpose of breaking the siphonic action, when the device is not in use, said pet-cock being provided with a funnel 53 for the reception of water, for the purpose of restoring the siphonic action.

In some instances the screw conveyor becomes clogged to such an extent that it will cease to operate by reason of the breaking of the drive chain or belt, and in such a case the grain and water would ordinarily flow in increasing speed, to cause loss of grain, and flooding of the machine. To prevent this I have provided means to prevent the grain flowing to the conveyor and for cutting off the supply of water to the conveyor.

Pivotally mounted in the branch 15, to normally close the opening 17, is a valve or door 54, the pivotal end of which is formed with a vertical arm 55 extending above the pivot, and externally of the pipe branch, as clearly seen in Figure 1, of the drawing. On the upper wall of the branch 15, directly above the baffle wall 18, is a depending stop shoulder 56, against which the free end of the door 54 engages, when raised into vertical or closed position. In the outer side of the lower end of the vertical pipe 14 there is formed an opening 57, and pivotally mounted at its upper end, for swinging movement in this opening, is a plate 58, which normally inclines downwardly and inwardly, within the pipe. On the outer end of the pivot of the plate 58, and extending beyond the rear vertical wall of the pipe 14, is an arm 59 to which is pivotally connected the lower end of an upwardly extending operating link 60. Pivotally mounted on the side wall of the upper portion of the pipe 14, in an approximate horizontal line with the pivot of the door 54, is an arm 61, the same extending over toward said pivot and being pivotally connected with the adjacent end of the link 62, which has its other end pivotally connected with the before-mentioned arm 55. The connection between the arm 61 and the link 62 is in the form of a rule or break joint 63, and connected to the pivot of this joint is the upper end of the before-mentioned link 60. Connected to the arm 55 and to the side of the pipe 14, below the pivot of the arm 59, is a coil spring 64, which normally tends to urge the door 54 into vertical position, or upwardly against the shoulder 56, this movement, however, being prevented by the joint between the arm 59 and the link 60, when these elements are disposed in a straight line, as shown in Figure 1. Normally the parts are in the position of Figures 1 and 2, the grain entering the branch 15, through the opening 16, and piling up on the door or plate 54, until it overflows the baffle 18, and falls into the vertical pipe 14. The grain then passes through the grid 35 and to the conveyor, through the opening 13. The weight of the grain, under the normal flow, will cause a slight downward movement of the grid, with the result that the cord or strap 36 is pulled down, and the wheel 32 rotated to a small degree. The rotation of the wheel pulls on the strap 38, which causes the tank 21 to be rocked so that a proper stream of water will flow from the lip 23, into the funnel 30, and onto the grain as it passes therebeneath with the conveyor. This produces a flow of water proportionate to the amount of grain passing through the conveyor. Should the flow of grain increase, the weight thereof would cause the grid to be lowered to a greater degree, with the result that the movement would be communicated to the tank, and the tank be rocked to a greater degree, with an increased amount of water discharged from the slot 22. Should the screw conveyor stop, for any reason, the grain will continue to flow, at the normal rate of speed, through the grid 35, and pile up in the pipe 14, below the grid. When a sufficient amount of grain has accumulated in the pipe 14, its weight will cause the plate 58 to swing outwardly toward and through the opening 17, which results in the link 60 pushing upwardly on the joint 63, and breaking same, whereby the spring is permitted to pull the door 54 into its vertical position. This closes the entrance to the pipe 14, and opens the outlet 17, so that the grain will flow from the branch 15. The grid 35 will then rise until the rocking tank is in such position that no water will flow from its spout. Were it not for the door 54, the grain flowing from the source, after the attendant had closed the valve from the source, would continue to pile up in the pipe 14, thus effectively choking said pipe, as well as the screw conveyor. A certain amount of grain flows from the source, after the controlling valve has been closed, and it is this excess of grain that is caused to flow out through the opening 17, to be caught in any suitable receptacle placed therebeneath. It often happens that the flow from the source cannot be cut off in sufficient time to prevent complete choking of the pipe 14, and it is with this difficulty in view that the door 54 is provided. Thus the grain flow, into the pipe 14, will be completely stopped, and the same directed out of the dampener, without waste of grain.

It will also be noted that the grain remaining within the pipe 14, after the door 54 has opened, is permitted to gradually escape through the outlet 57, by reason of the pressure against the door 58, by the grain.

Thus the dampener is relieved of sudden choking in the event that the attendant is unable to reach the controlling valve of the source of supply of grain, and cut off such flow before the dampener would ordinarily be choked, and the water tank 21 permitted to flood the machine. Repairs and adjustments can then be made, without loss of time, and without grain flowing into the machine, or water causing the flooding of the same.

Disposed centrally within the rocking tank 21 is a longitudinally extending cylinder 65, which has an elongated longitudinal opening 66 in its lower side, and has its upper side secured to the adjacent end of the siphon pipe 25, whereby to form a vacuum space which will increase the action of the siphon.

What is claimed is:

1. In a grain dampener, the combination with a grain conveyor, of a grain conduit for conducting grain to the conveyor, a grid movable in the conduit under the influence of the flow of grain therethrough, a rockable water holding and supplying means for supplying a normal flow of water to the grain in the conveyor and movable to increase the flow of water, and connections between the grid and the water holding and supplying means whereby excessive movement of the grid will rock the water supplying means to increase the flow of water to the grain in the conveyor.

2. In a grain dampener, the combination with a grain conveyor, of a conduit for conducting grain to the conveyor, a grid movable to a certain degree in the conduit under the influence of and in the direction of the grain passing therethrough, a rockable tank for discharging water onto the grain in the conveyor, and connections between the grid and tank whereby the latter will be rocked to a degree to discharge a greater amount of water to the grain passing through the grid as the grid moves under the weight of an increase in the flow of grain.

3. In a grain dampener, the combination with a grain conveyor, of a conduit for conducting grain to the conveyor, a grid movable longitudinally in the conduit and inactive under normal flow of grain therethrough, a rockable water tank for constantly discharging water into the conveyor, a rotatable element, connections between the grid and the rotatable element, and connections between the rotatable element and the water tank whereby movement of the grid will be communicated to the tank to rock the latter and deliver more water into the grain passing through the conveyor.

4. In a grain dampener, the combination with a conveyor, of a conduit for conducting grain to the conveyor, a grid movable in the conduit, a rockable water tank, means for constantly supplying water to the tank, a wheel mounted on the conduit and having a concentric flange and a spiral flange, a flexible element connected to the grid and with the periphery of the wheel, a flexible element connected with the tank and the concentric flange, a slidable weight, and a flexible element connected with the weight and spiral flange.

5. A grain dampener including a grain feeding means, a conveyor for receiving grain from the feeding means, a water feeding means controlled by the grain feeding means, the grain feeding means having a discharge outlet leading away from the conveyor, and means within the grain feeding means, beyond said outlet, for actuation by the weight of the excess of grain in the feeding means to close the entrance to the grain feeding means and open the outlet to permit said excess of grain to be discharged away from the conveyor.

6. A grain dampener including a grain feeding conduit having an inlet and a discharge, a conveyor disposed for receiving grain from the discharge, the conduit having an auxiliary discharge adjacent the inlet, for directing grain away from the feeding conduit, a second discharge adjacent the first discharge and leading away from the conveyor, means movable from the auxiliary discharge to the inlet, means within the second discharge operable by the weight of an excess of grain in the conduit for discharging the excess grain away from the conveyor, and connections between the second discharge means and said auxiliary discharge.

7. A grain dampener including a grain feeding conduit having an inlet, an emergency outlet adjacent the inlet, a main discharge, and an auxiliary discharge, the latter being arranged adjacent the main discharge, a door normally closing the emergency outlet and normally urged into position to close the inlet, releasable means for maintaining the door in outlet closing position, and means in the auxiliary discharge connected with said releasable means and operable by an excess of grain adjacent the main discharge for releasing the releasable means and permitting the door to move into inlet closing position.

8. A grain dampener including a grain feeding conduit having an inlet at one end and a discharge at the other end, the conduit having an auxiliary discharge adjacent the inlet, a door normally closing the auxiliary discharge and movable into position to open said discharge and close the inlet, means for maintaining the door in closing relation to the auxiliary discharge, means normally urging the door into inlet closing position, and means adjacent the first-named discharge and operatively connected with the maintaining means for releasing said means and permitting the opening means to function.

9. A grain dampener including a grain feeding conduit having an inlet and a discharge at one end and a discharge at the other end, a door movably mounted in the conduit and normally closing the first discharge, movable means connected with the conduit and door for maintaining the door in closing relation to the first discharge, resilient means connected with the door and the conduit for normally urging the door away from the first discharge and into closing relation to the inlet, movable means in the conduit adjacent the second discharge operable by the weight of an excess of grain in the conduit, and a connection between the last-named movable means and the maintaining means for releasing the latter and permitting the resilient means to move the door.

In testimony whereof, I affix my signature, in the presence of two witnesses.

DANIEL BARTLETT.

Witnesses:
  S. H. BELL,
  JOHN O'BRIEN.